United States Patent
Das et al.

(10) Patent No.: US 7,403,659 B2
(45) Date of Patent: Jul. 22, 2008

(54) METHOD AND APPARATUS FOR DIFFERENTIATING PEDESTRIANS, VEHICLES, AND OTHER OBJECTS

(75) Inventors: Aveek Kumar Das, Philadelphia, PA (US); Theodore Armand Camus, Marlton, NJ (US); Peng Chang, West Windsor, NJ (US)

(73) Assignee: Sarnoff Corporation, Princeton, NJ (US)

(*) Notice: Subject to any disclaimer, the term of this patent is extended or adjusted under 35 U.S.C. 154(b) by 765 days.

(21) Appl. No.: 10/930,735

(22) Filed: Aug. 30, 2004

(65) Prior Publication Data

US 2005/0084156 A1 Apr. 21, 2005

Related U.S. Application Data

(60) Provisional application No. 60/549,203, filed on Mar. 2, 2004, provisional application No. 60/498,437, filed on Aug. 28, 2003.

(51) Int. Cl.
G06K 9/62 (2006.01)
(52) U.S. Cl. ................. 382/224; 382/158
(58) Field of Classification Search ................. 382/224, 382/168, 158
See application file for complete search history.

(56) References Cited

U.S. PATENT DOCUMENTS

| 4,783,829 | A | * | 11/1988 | Miyakawa et al. ........... 382/199 |
| 5,487,116 | A | * | 1/1996 | Nakano et al. ............... 382/104 |
| 5,761,326 | A | * | 6/1998 | Brady et al. ................. 382/103 |
| 6,208,749 | B1 | | 3/2001 | Gutkowicz-Krusin et al. |

* cited by examiner

Primary Examiner—Matthew C. Bella
Assistant Examiner—Mike Rahmjoo
(74) Attorney, Agent, or Firm—Lowesntein Sandler PC (57) ABSTRACT

A method and apparatus for classifying an object in an image is disclosed. Edge energy information and/or intensity variation information is generated for an object in a region of interest of the image. The object occupying the region of interest is classified based on the edge energy information and/or intensity variation information.

12 Claims, 7 Drawing Sheets

METHOD AND APPARATUS FOR DIFFERENTIATING PEDESTRIANS, VEHICLES, AND OTHER OBJECTS

CROSS-REFERENCE TO RELATED APPLICATIONS

This application claims the benefit of U.S. provisional patent application Nos. 60/498,437 filed, Aug. 28, 2003 and 60/549,203, filed Mar. 2, 2004, which are herein incorporated by reference.

BACKGROUND OF THE INVENTION

1. Field of the Invention

The present invention relates to artificial or computer vision systems, e.g. vehicular vision systems. In particular, this invention relates to a method and apparatus for detecting automobiles and pedestrians in a manner that facilitates collision avoidance.

2. Description of the Related Art

Collision avoidance systems utilize a sensor system for detecting objects in front of an automobile or other form of vehicle or platform. In general, a platform can be any of a wide range of bases, including a boat, a plane, an elevator, or even a stationary dock or floor. The sensor system may include radar, an infrared sensor, or another detector. In any event the sensor system generates a rudimentary image of the scene in front of the vehicle. By processing that imagery, objects can be detected. Collision avoidance systems generally identify when an object is in front of a vehicle, but usually do not classify the object or provide any information regarding the movement of the object.

Therefore, there is a need in the art for a method and apparatus that provides for differentiating detected objects.

SUMMARY OF THE INVENTION

The present invention describes a method and apparatus for classifying an object in an image. In one embodiment, edge energy information and/or intensity variation information is generated for an object in a region of interest of the image. The object occupying the region of interest is classified based on the edge energy information and/or intensity variation information.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention discloses in one embodiment method and apparatus for classifying an object in a region of interest based on one or more features of the object. Detection and classification of pedestrians, vehicles, and other objects are important, e.g., for automotive safety devices, since these devices may deploy in a particular fashion only if a target of the particular type (i.e., pedestrian or car) is about to be impacted. In particular, measures employed to mitigate the injury to a pedestrian may be very different from those employed to mitigate damage and injury from a vehicle-to-vehicle collision.

Figure 1:
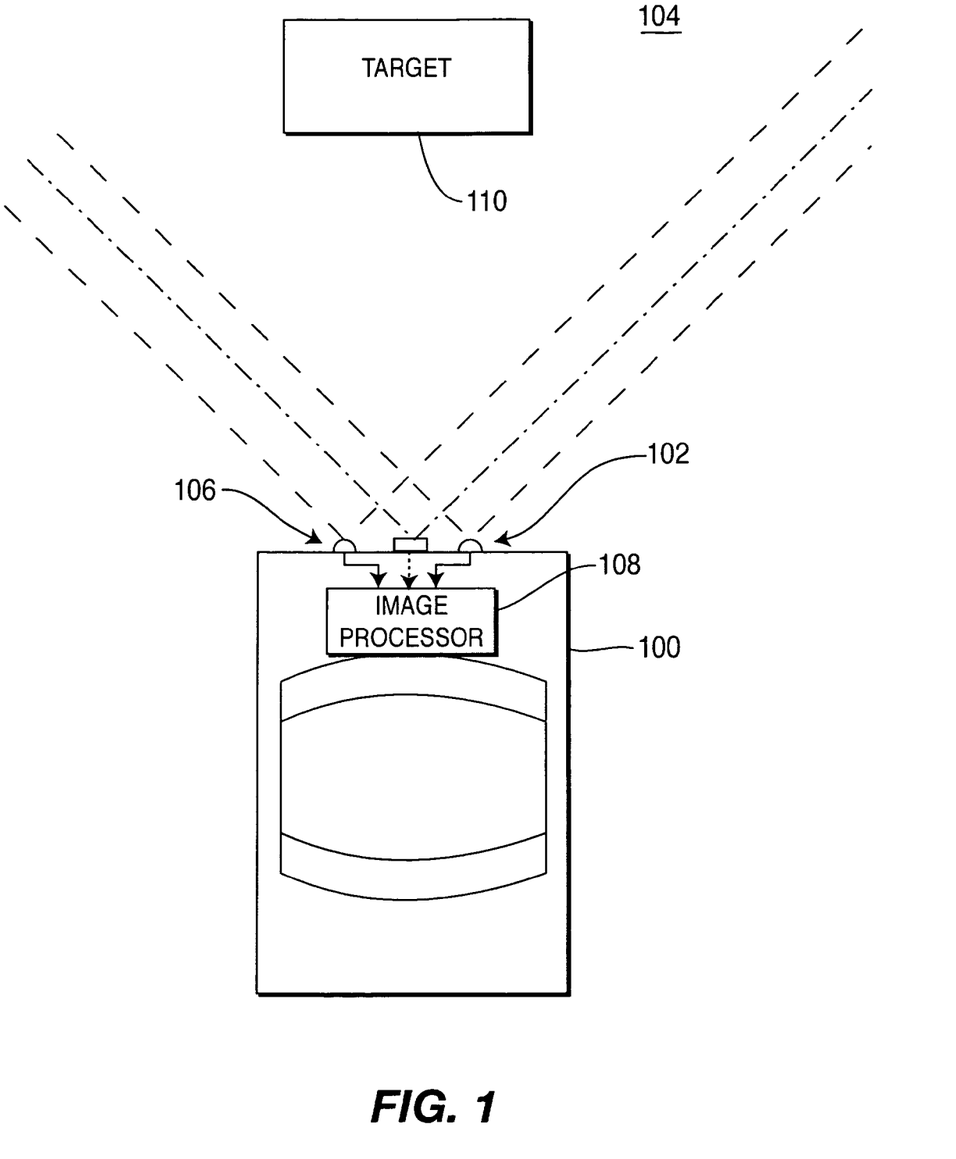
FIG. 1 depicts one embodiment of a schematic view of a vehicle utilizing the present invention.

FIG. 1 depicts a schematic diagram of a vehicle 100 having a target differentiation system 102 that differentiates a pedestrian (or pedestrians) 110 within a scene 104 that is proximate the vehicle 100. It should be understood that target differentiation system 102 is operable to detect pedestrians, automobiles, or other objects. While in the illustrated embodiment scene 104 is in front of vehicle 100, other object detection systems may image scenes that are behind or to the side of vehicle 100. Furthermore, target differentiation system 102 need not be related to a vehicle, but can be used with any type of platform, such as a boat, a plane, an elevator, or even stationary streets, docks, or floors. Target differentiation system 102 comprises a sensor array 106 that is coupled to an image processor 108. The sensors within the sensor array 106 have a field of view that includes one or more targets.

The field of view in a practical object detection system 102 may be ±12 meters horizontally in front of the vehicle 100 (e.g., approximately 3 traffic lanes), with a ±3 meter vertical area, and have a view depth of approximately 12-40 meters. Therefore, it should be understood that the present invention can be used in a pedestrian detection system or as part of a collision avoidance system.

Figure 2:
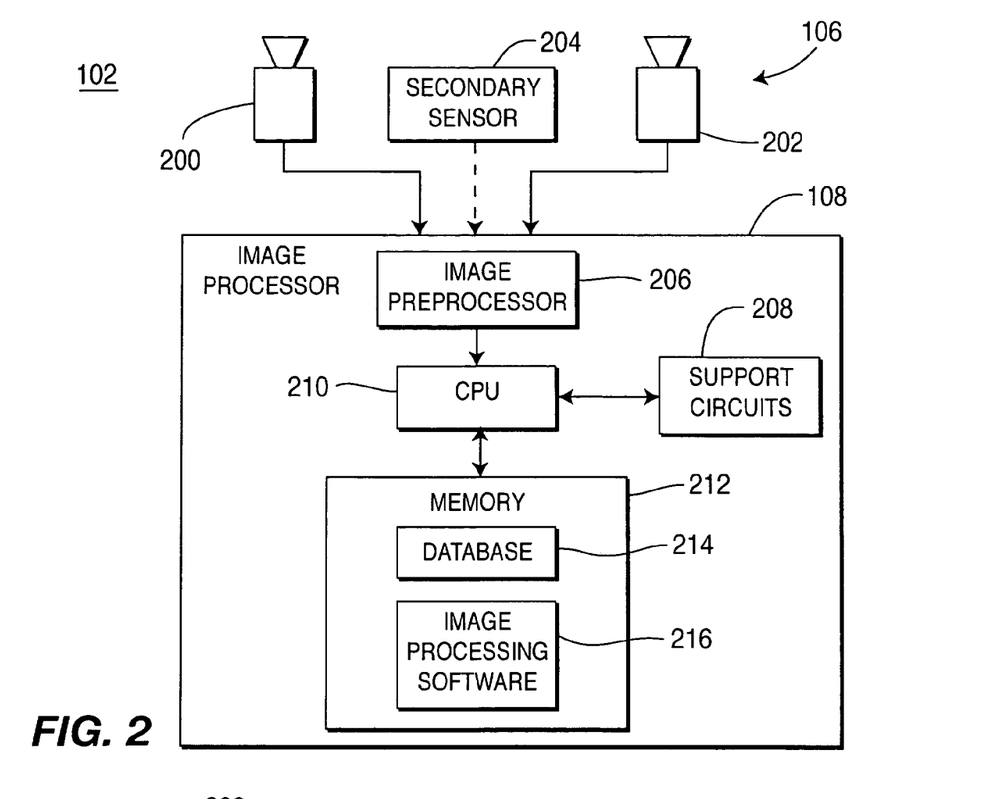
FIG. 2 depicts a block diagram of a vehicular vision system in accordance with one embodiment of the present invention.

FIG. 2 depicts a block diagram of hardware used to implement the target differentiation system 102. The sensor array 106 comprises, for example, a pair of cameras 200 and 202. In some applications an optional secondary sensor 204 can be included. The secondary sensor 204 may be radar, a light detection and ranging (LIDAR) sensor, an infrared range finder, a sound navigation and ranging (SONAR) senor, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. CPU 210 is supported by support circuits 208 that are generally well known in the art. These circuits include cache, power supplies, clock circuits, input-output circuitry, and the like. Memory 212 is also coupled to CPU 210. Memory 212 stores certain software routines that are retrieved from a storage medium, e.g., an optical disk, and the like, and that are executed by CPU 210 to facilitate operation of the present invention. Memory 212 also stores certain databases 214 of information that are used by the present invention, and image processing software 216 that is used to process the imagery from the sensor array 106. Although the present invention is described in the context of a series of method steps, the method may be performed in hardware, software, or some combination of hardware and software (e.g., an ASIC). Additionally, the methods as disclosed can be stored on a computer readable medium.

Figure 3:
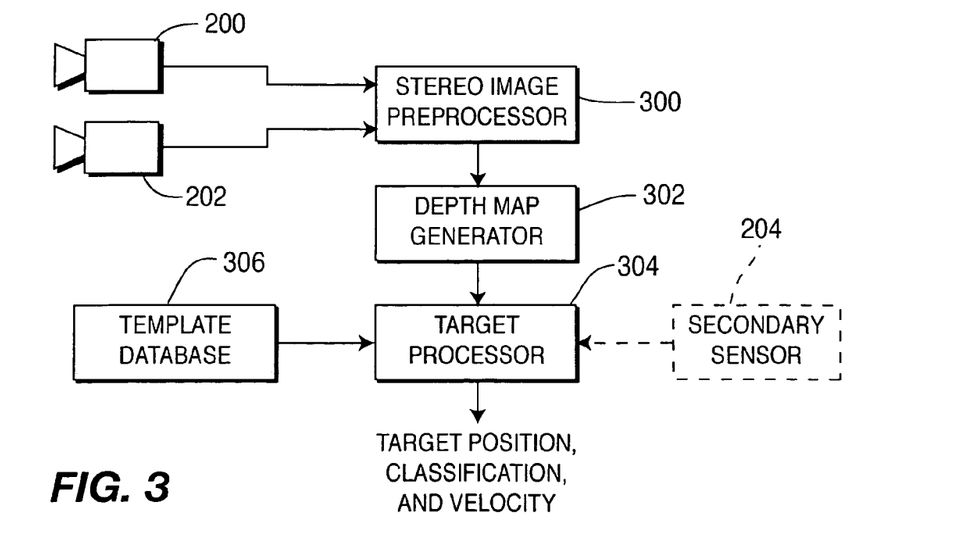
FIG. 3 depicts a block diagram of functional modules of the vision system of FIG. 2 in accordance with one embodiment of the present invention.

FIG. 3 is a functional block diagram of modules that are used to implement the present invention. The stereo cameras 200 and 202 provide stereo imagery to a stereo image preprocessor 300. The stereo image preprocessor is coupled to a depth map generator 302 which is coupled to a target processor 304. Depth map generator 302 may be utilized to define a region of interest (ROI), i.e., an area of the image that potentially contains a target 110. In some applications the depth map generator 302 is not used. In applications where depth map generator 302 is not used, ROIs would be determined using image-based methods. The following will describe the functional block diagrams under the assumption that a depth map generator 302 is used. The target processor 304 receives information from a target template database 306 and from the optional secondary sensor 204. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

For both hardware and practical reasons, creating disparity images having different resolutions is beneficial when detecting objects. Calibration provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the multi-resolution disparity images into a two-dimensional depth image. The depth image (also referred to as a depth map) contains image points or pixels in a two dimensional array, where each point represents a specific distance from the sensor array to point within the scene. The depth image is then processed by the target processor 304 wherein templates (models) of typical objects encountered by the vision system are compared to the information within the depth image. As described below, the template database 306 comprises templates of objects (e.g., automobiles, pedestrians) located at various positions and depth with respect to the sensor array.

An exhaustive search of the template database may be performed to identify a template that most closely matches the present depth image. The secondary sensor 204 may provide additional information regarding the position of the object relative to the vehicle, velocity of the object, size or angular width of the object, etc., such that the target template search process can be limited to templates of objects at about the known position relative to the vehicle. If the secondary sensor is a radar sensor, the sensor can, for example, provide an estimate of both object position and distance. The target processor 304 produces a target list that is then used to identify target size and classification estimates that enable target tracking and the identification of each target's position, classification and velocity within the scene. That information may then be used to avoid collisions with each target or perform pre-crash alterations to the vehicle to mitigate or eliminate damage (e.g., lower or raise the vehicle, deploy air bags, and the like).

Figure 4:
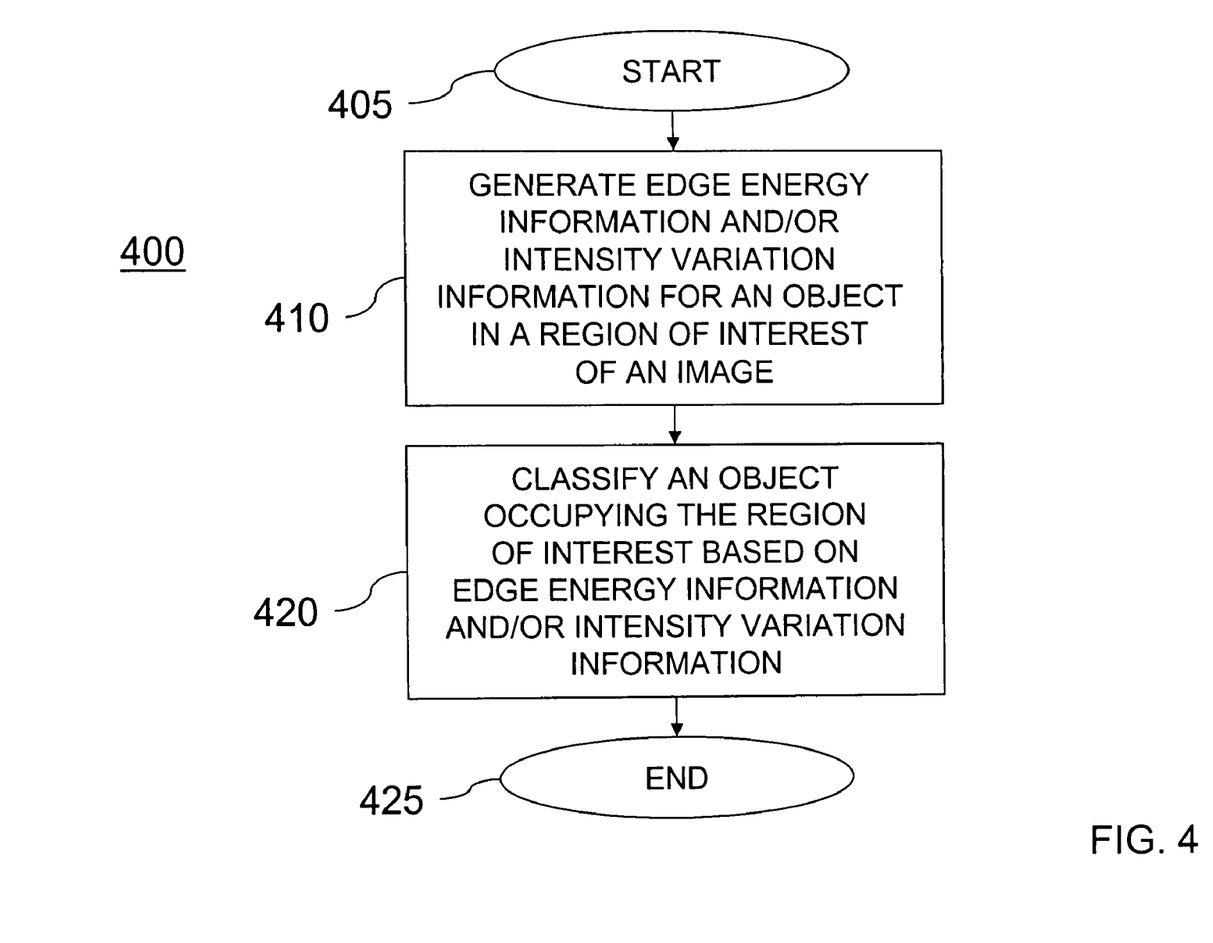
FIG. 4 illustrates a flow diagram in accordance with a method of the present invention.

FIG. 4 depicts a flow diagram of a method 400 for classifying an object in an image. The method 400 begins at step 405 and proceeds to step 410. In step 410, edge energy information and/or intensity variation information is generated for an object in a region of interest (ROI). The present invention describes the use of a depth based method to find a ROI where a target 110 may be located, however, ROIs may also be determined using image based methods.

In step 420, object(s) occupying the ROI are classified based on edge energy and/or intensity variation information of the target. In one embodiment, object(s) occupying the ROI are classified based on at least one of edge energy information and intensity variation information. Once edge energy information and/or intensity variation information is found, other information related to the edge energy and/or intensity variation located in the ROI may be found and utilized in making a classification.

In one embodiment the object is classified based on horizontal edge energy. Vehicles, in particular cars, often have strong horizontal edges. Thus, it is possible to distinguish vehicles in this manner.

In one embodiment the object is classified based on vertical edge energy. Most pedestrians have two strong vertical edges. A variation on vertical edge energy is paired edge energy, i.e., a combination of the scores of two edges at expected distances from each other, representing the left and right visible edges of the pedestrian. Vehicles may also have vertical edge energy as well, although the ratio of vertical edge and horizontal edge energy would be expected to be higher for pedestrians than vehicles.

In one embodiment, the object is classified based on intensity variation or maximum contrast (one measure of which might be standard deviation). One might expect a higher maximum intensity range for vehicles rather than for a pedestrian's shirt or pants taken individually.

In one embodiment, the object is classified based on symmetry. For example, most vehicles are symmetrical in many ways about the rear center of the vehicle (whether a license plate is present or not). This symmetry may be measured in terms of pixel intensities, or other higher-level measures such as texture or edge energies.

In one embodiment, the object is classified based on its shadow. Vehicles may be detected by its shadow beneath it, particularly on sunny days, where a pedestrian would not have this shadow.

In one embodiment, the width of a pedestrian is determined. Since, pedestrians are significantly thinner than most vehicles, a pedestrian's width may be measured by detecting the underlying asphalt beneath and behind a walking person. For example, windowed regions surrounding a default pedestrian width may be measured for asphalt-like qualities, such as intensity or low texture, whereas the center region (the hypothesized pedestrian) would not have these asphalt-like qualities. This method can be particularly useful in the image space since standard stereo depth image methods often overestimate the size of the target, due to the windowing effects of the method used.

In one embodiment, the object is classified based on its "parts". A dedicated head and shoulders detector may be able to discriminate pedestrians from other targets, particularly at the closer ranges. For example, the 2-D outline of a human figure may be tessellated into regions which are expected to contain human body parts such as a head, shoulders, arms, torso, etc., and region outside these parts (such as above a shoulder and beside the head) would be expected to be background, such as the asphalt behind and beneath the pedestrian. Measures which distinguish the two (such as texture measures or intensity measures) can then be applied to generate a strong pedestrian-detection filter.

In one embodiment, the object is classified based on a histogram of pixel intensity values in a region of interest of the image. This embodiment is explained in more detail in FIG. 5.

Each of the above embodiments (e.g., edge energy information or intensity variation information) is considered a "feature". The indicative features may be used in several ways to differentiate pedestrians from vehicles.

One method is to combine each feature as a conjunction of tests, setting each individual test's thresholds such that any pedestrian (or vehicle) will be expected to pass each test. However, a non-pedestrian would be expected to fail at least one of these tests, despite the particular threshold settings.

Another method is to require that a pedestrian or vehicle classification pass some threshold subset number of these tests. For example, a pedestrian classification may be required to pass 5 out of 7 possible pedestrian-defining tests.

Another method is to award points for each test passed, depending on the discriminatory power of each test. A given classification would be required to exceed a certain threshold of points. (Note that the previous method may be regarded as a specific case of this method where each test has equal value.)

It should be apparent to one skilled in the art that other known methods could be implemented along with features of the present invention. Known standard methods such as Fisher's linear discriminant, neural networks, or SVM (support vector machines) may be used to classify pedestrians or vehicles, using the above features as inputs.

Figure 5:
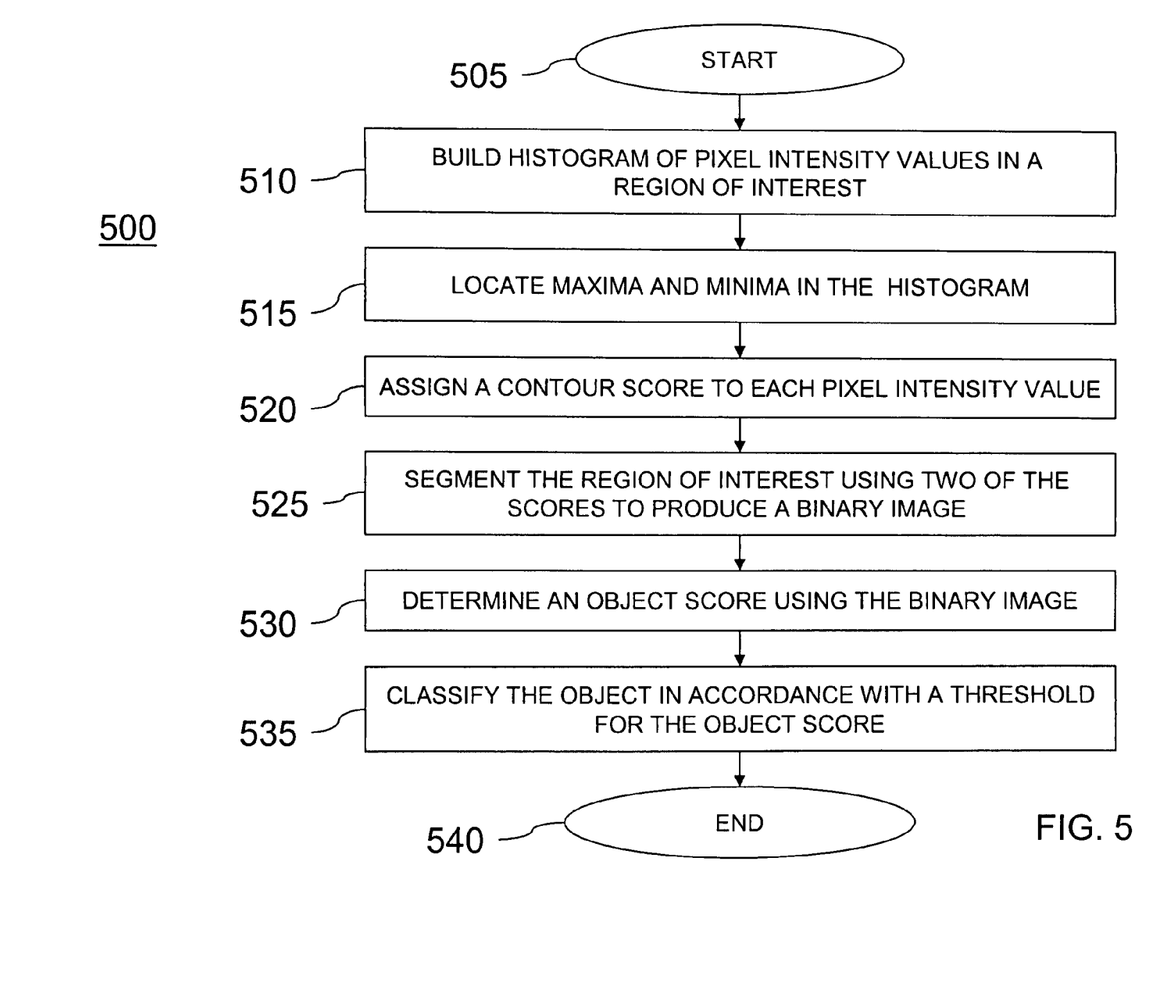
FIG. 5 illustrates a flow diagram in accordance with a method of the present invention.

FIG. 5 depicts a flow diagram of a method 500 of classifying an object in an image. The method 500 begins at step 505 and proceeds to step 510. In step 510, a histogram of pixel intensity values in a region of interest is built.

Finding peaks in histograms is a widely studied problem and there exist several methods for doing this efficiently. The present invention uses a signal processing approach where the histogram is smoothed by convolving the histogram with an averaging filter, and then applying a filter called the "mean-shift" filter to locate the local maxima and minima.

In step 515, maxima and minima are located in the histogram. Once all peaks (maxima) and valleys (minima) have been located, the intensity values that define interesting contiguous regions (segments) in the image are identified. The intensity values can be thought of as image contours that segment the image into different regions based on similar intensity values.

In step 520, contour scores are assigned to each pixel intensity value. Intensity values (contours) are chosen for the final segmentation by assigning a numeric score to each candidate intensity value (or histogram bin). To calculate this "contour score", each valley, as located by the mean-shift filtering of the image histogram (as mentioned above), and the two adjacent peaks on either side of this valley, is considered. In one example, the following formula is used for the computation:

$$\text{contour\_score} = (y1-y2)+(y3-y2)+\text{abs}((x2-x1)-(x3-x2))/(x3-x1)$$

Where, the two peaks are parameterized by (x1, y1) and (x3, y3), with x1 referring to the intensity bin value and y1 referring to the number of image pixel counts in bin x1. Similarly the valley is represented by (x2, y2) in the above formula. The basic idea is to evaluate how well a valley divides two regions which have peaks (local maxima) in them. The relative heights of the peaks and the relative spacing between the peaks and valleys in terms of intensity values affect the score. At the end of the contour scoring process a list of valleys or local minima and their associated scores using the above formula is provided.

Figure 6:
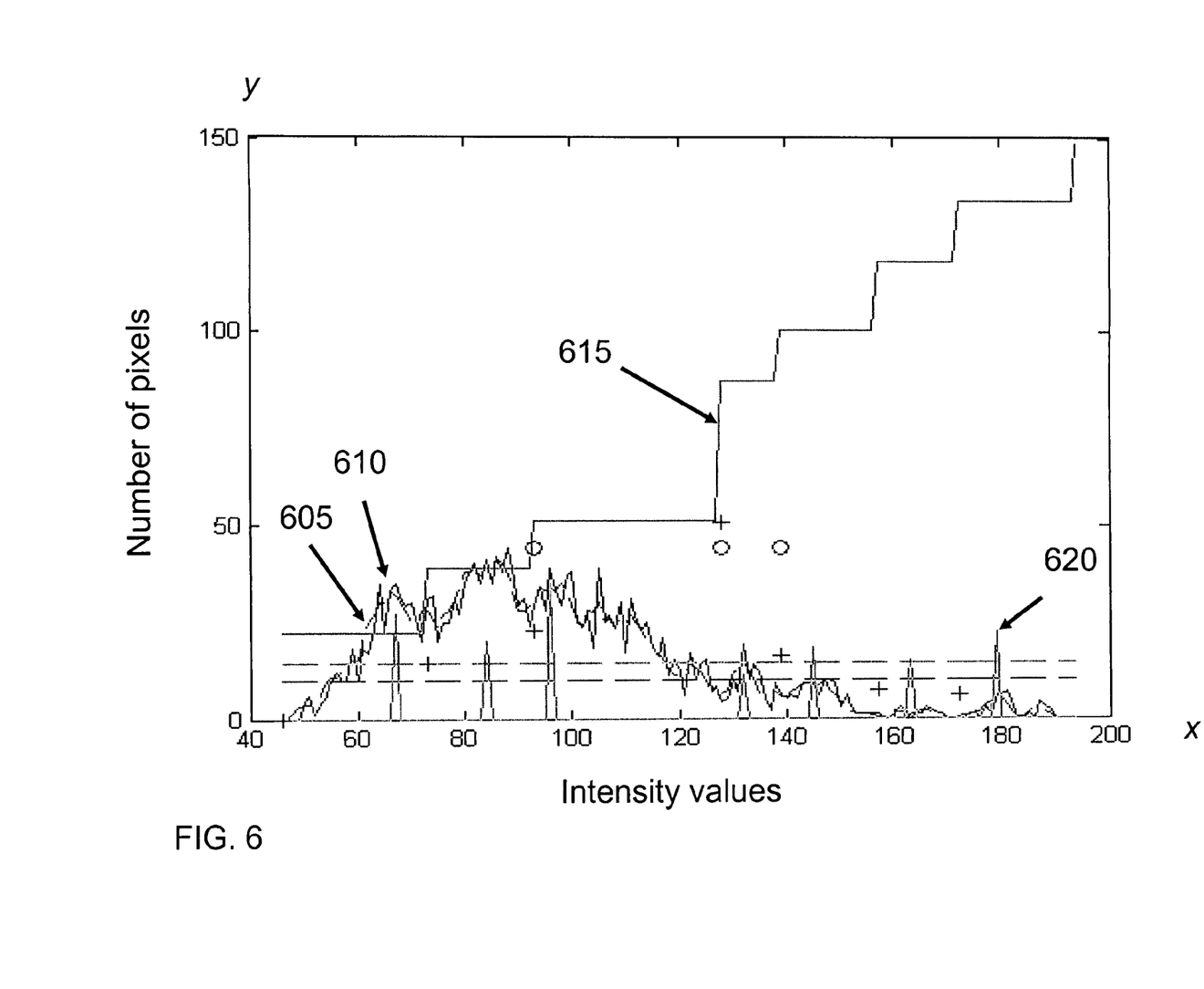
FIG. 6 illustrates an example of a histogram having maxima and minima in accordance with one embodiment of the present invention.

FIG. 6 illustrates an example of a histogram having maxima and minima. The result of smoothing 605 and mean-shift filtering 610 on the image histogram is shown. Pulse-like feature 620 shows peaks and step-like feature 615 shows valleys. The evaluated contours scores (Y-axis) for the valleys (X-axis) are shown with crosses and the best three contour choices are shown with circles.

In step 525, the ROI is segmented using two of the contour scores to produce a binary image. In order to select the most interesting segmented region the following method is utilized. First, the case where at least two valleys (three peaks) are provided is considered. The valleys are rank ordered according to the contour score as described above. From the sorted list, the top two candidates are picked with some additional heuristics to avoid saturated regions. For example, saturated regions would be avoided when, given an image with intensity levels between 0 and 256, if there are candidate valleys with high scores but with intensity values within a small margin of 0 or 256, those candidate valleys would be discarded from a list of probable choices. The image is then segmented by thresholding the intensity values between the two chosen contours to generate a binary image. Finally the rows and columns of the binary image are summed (separately) to generate the "row sum" and "column sum" vectors. Then these projected sums are used to generate a measure for object classification for cars and pedestrians.

Figure 7:
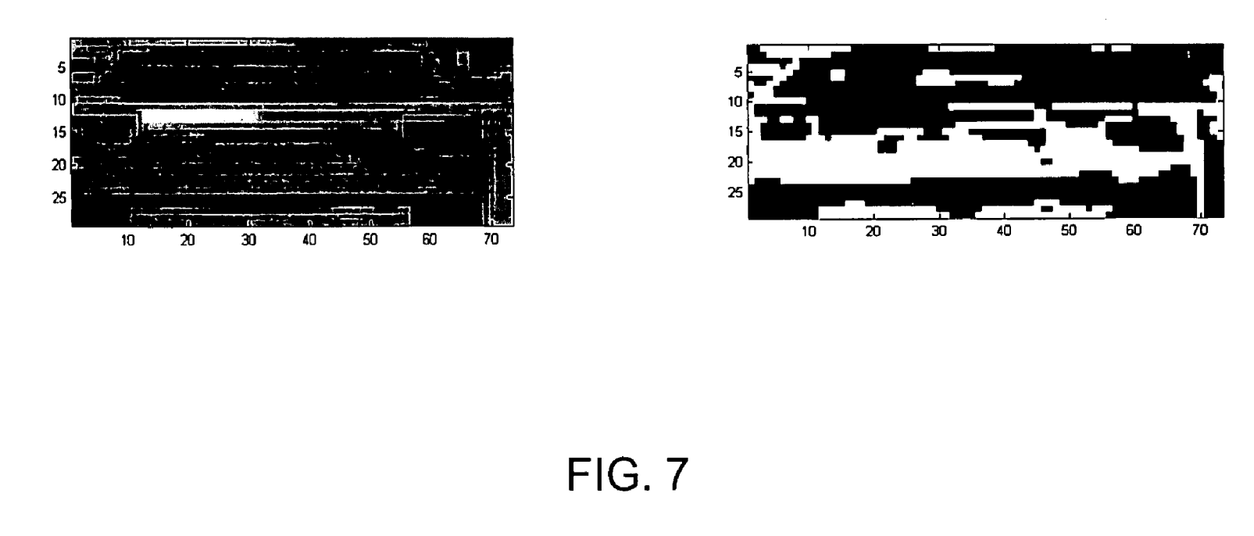
FIG. 7 illustrates an example of a segmented region of interest in accordance with one embodiment of the present invention.

FIG. 7 illustrates an example of a segmented region of interest. The left image shows a typical image ROI having a car. The right image shows the corresponding segmented image using a threshold based the contour scores.

In step 530, an object score is determined using the binary image. In one embodiment, the mean deviation in the values of the row sum vector and column sum vector is computed and scaled with the aspect ratio of the rectangular image ROI (width w, height h) in order to obtain an object score using the following formula:

$$\text{object\_score} = 0.1*(\text{alpha}*(w/md\_y)+\text{beta}*(md\_x/h))$$

where md_y equals a mean deviation of the row sum vector; md_x equals a mean deviation of the column sum vector; h is a height of the ROI; w is a width of the ROI; and the tuning parameters, e.g., are alpha=⅓ and beta=⅔. The values for the tuning parameters are adjustable in accordance with application specific requirements.

In another embodiment, the object score is determined using the following formula:

$$\text{object\_score} = 0.5*(\text{alpha}*(h\_1/w\_1)+\text{beta}*(w\_2/h\_2))$$

where
h_1=(max(row_sum)−min(row_sum));
h_2=(max(column_sum)−min(column_sum));
w_1=length(row_sum);
w_2=length(column_sum); and tuning parameters are alpha=⅓ and beta=⅔ (Tuning parameters are adjustable in accordance with application specific requirements.)

Figure 8:
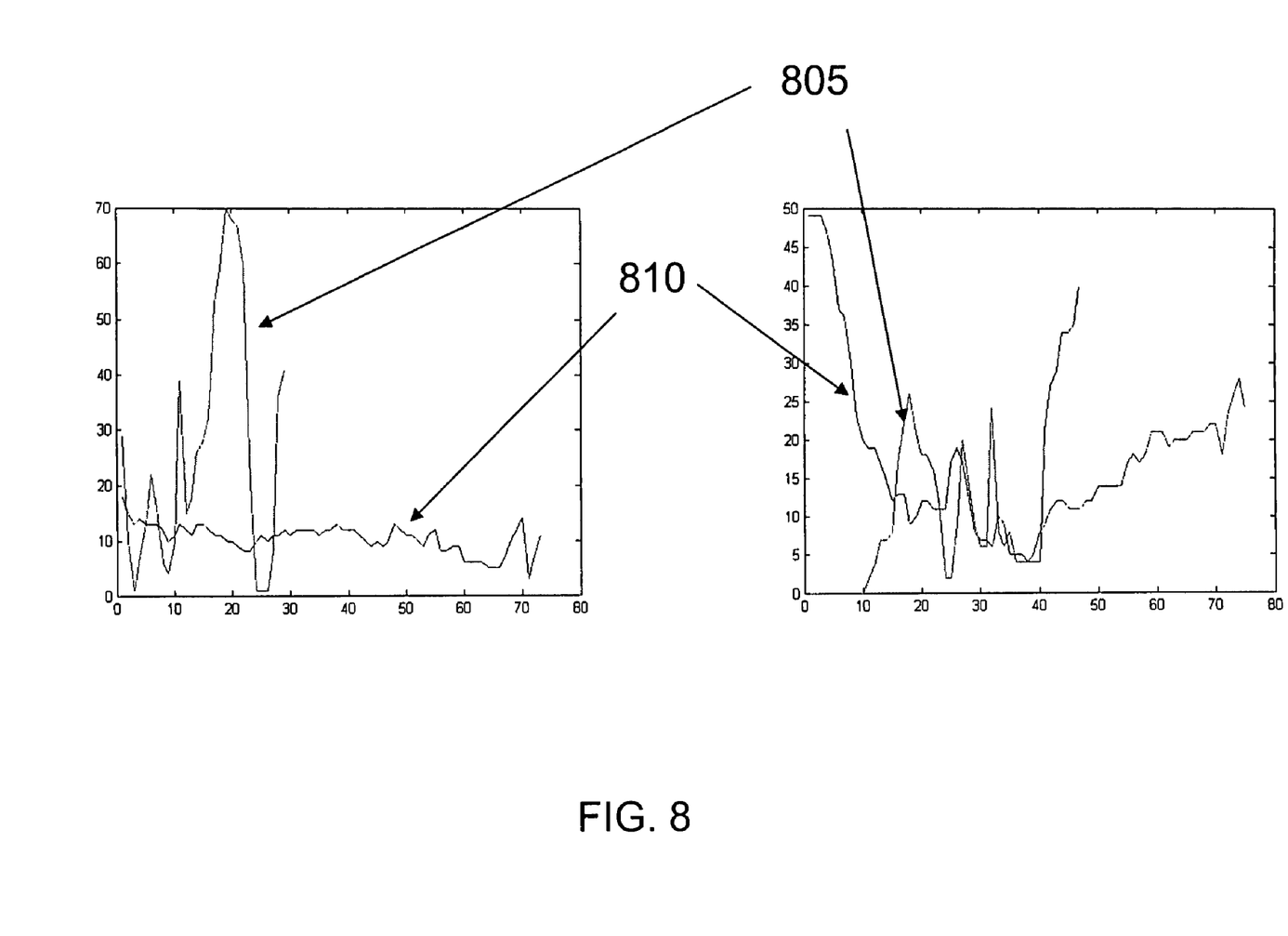
FIG. 8 illustrates typical row and column sum vectors for a car and a pedestrian in accordance with one embodiment of the present invention.

FIG. 8 illustrates typical row 805 and column 810 sum vectors for a car (left) and a pedestrian (right). The important observation here is the presence of high variations in the row sum as compared to the column sum for the car image. The presence of these high variations in the row sum illustrates that the contiguous segments in an image ROI with a car comprise horizontal sections. This appears to be the case for the majority of the cases when a car is in the image.

In step 535, the object is classified in accordance with a threshold for the object score. In one embodiment, the object score from the histogram based segmentation method can be used for classification as follows:

| | |
|---|---|
| 0.25 <= object_score < 0.5 | Pedestrian |
| 0.9 > object_score >= 0.5 | Unknown |
| car_score >= 0.9 | Car |

The present invention allows the score to be offset by a large constant so that the higher level classification algorithm knows that the score is low confidence. This would occur in the case where the image contrast is low or the size of target ROI is small.

The present invention provides an option to check symmetries along both horizontal and vertical directions and penalize the object score accordingly. This would be useful in the case where a lot of background is included in the image ROI, in addition to the above cases.

The present invention allows for the employment of additional heuristics to narrow the choice of candidate contours. These techniques are useful in cases where there are a lot of candidate contours for segmenting the ROI.

While the foregoing is directed to embodiments of the present invention, other and further embodiments of the invention may be devised without departing from the basic scope thereof, and the scope thereof is determined by the claims that follow.

The invention claimed is:

1. A method of classifying an object in an image, comprising:
    building a histogram of pixel intensity values in a region of interest of the image;
    locating maxima and minima in the histogram;
    generating a binary image in accordance with said maxima and minima;
    assigning a contour score to each pixel intensity value associated with at least one said local minimum;
    segmenting the region of interest using two of the contour scores to produce a binary image; and
    classifying said object using said binary image.

2. The method of claim 1, wherein the histogram is smoothed using an averaging filter.

3. The method of claim 2, wherein a mean-shift filter is applied to locate the maxima and minima.

4. The method of claim 3, wherein the contour score is obtained in accordance with:

contour_score=(y1−y2)+(y3−y2)+abs((x2−x1)−(x3−x2))/(x3−x−1) where local maxima comprise (x1, y1) and (x3, y3) and a local minimum comprises (x2, y2), and where x1, x2, and x3 refer to intensity bin values and y1, y2, and y3 refer to image pixel counts in x1, x2, and x3, respectively.

5. The method of claim 4, wherein a rank ordered list of each of the minima and contour scores associated with each of the minima is generated.

6. The method of claim 5, wherein two highest contour scores are selected from the rank ordered list.

7. The method of claim 6, wherein segmenting the image further comprises thresholding the pixel intensity values of the region of interest using the two highest contour scores to create said binary image.

8. The method of claim 7, wherein row sum vectors and column sum vectors are generated from the binary image.

9. A computer-readable medium having stored thereon a plurality of instructions, the plurality of instructions including instructions which, when executed by a processor, cause the processor to perform the steps of a method for classifying an object in an image, comprising:
    building a histogram of pixel intensity values in a region of interest of the image;
    locating maxima and minima in the histogram;
    generating a binary image in accordance with said maxima and minima;
    assigning a contour score to each pixel intensity value associated with at least one said local minimum;
    segmenting the region of interest using two of the contour scores to produce a binary image; and
    classifying said object using said binary image.

10. An apparatus for classifying an object in an image, comprising:
    means for building a histogram of pixel intensity values in a region of interest of the image;
    means for locating maxima and minima in the histogram;
    means for generating a binary image in accordance with said maxima and minima;
    generating a binary image in accordance with said maxima and minima;
    means for assigning a contour score to each pixel intensity value associated with at least one said local minimum;
    means for segmenting the region of interest using two of the contour scores to produce a binary image; and
    means for classifying said object using said binary image.

11. A method of classifying an object in an image, comprising:
    building a histogram of pixel intensity values in a region of interest of the image;
    locating maxima and minima in the histogram;
    generating a binary image in accordance with said maxima and minima;
    assigning a contour score to each pixel intensity value associated with at least one said local minima;
    segmenting the region of interest using two of the contour scores to produce a binary image;
    determining an object score using the binary image; and
    classifying the object in accordance with a threshold for the object score.

12. The method of claim 11, wherein the object score is determined by computing a mean deviation in values of row sum vectors and colum sum vectors and scaling the mean deviation with an aspect ratio of the binary image.

* * * * *